United States Patent
Hohlbein et al.

(10) Patent No.: US 11,896,117 B2
(45) Date of Patent: Feb. 13, 2024

(54) ORAL CARE IMPLEMENT

(71) Applicant: Colgate-Palmolive Company, New York, NY (US)

(72) Inventors: Douglas Hohlbein, Hopewell, NJ (US); Chi Shing Wong, Warren, NJ (US)

(73) Assignee: Colgate-Palmolive Company, New York, NY (US)

( * ) Notice: Subject to any disclaimer, the term of this patent is extended or adjusted under 35 U.S.C. 154(b) by 214 days.

(21) Appl. No.: 17/248,412

(22) Filed: Jan. 25, 2021

(65) Prior Publication Data

US 2021/0145159 A1    May 20, 2021

Related U.S. Application Data (63) Continuation of application No. 15/953,595, filed on Apr. 16, 2018, now Pat. No. 10,925,384.

(51) Int. Cl.
*A46B 5/02*    (2006.01)
*A46B 9/04*    (2006.01)

(52) U.S. Cl.
CPC .............. *A46B 5/026* (2013.01); *A46B 9/04* (2013.01); *A46B 2200/1066* (2013.01)

(58) Field of Classification Search
CPC ... A46B 15/0085; A46B 15/0087; A46B 5/02; A46B 5/026
See application file for complete search history.

(56) References Cited

U.S. PATENT DOCUMENTS

| | | | | |
|---|---|---|---|---|
| 2,094,240 | A | * | 9/1937 | Herrick ................ A46B 5/02 15/167.1 |
| D324,775 | S | * | 3/1992 | Kreisher .................... D4/138 |
| 6,276,020 | B1 | | 8/2001 | Leversby et al. |
| 6,687,940 | B1 | * | 2/2004 | Gross .................. A46B 5/026 15/167.1 |

(Continued)

FOREIGN PATENT DOCUMENTS

| | | | | |
|---|---|---|---|---|
| AU | 2012200354 A1 | | 2/2012 | |
| CA | 2261355 A1 | * | 8/2000 | ............ A46B 5/02 |

(Continued)

OTHER PUBLICATIONS

Computer generated English Translation of JP 2001186926, Umehara et al., Jul. 2001. (Year: 2001).*

(Continued)

*Primary Examiner* — Laura C Guidotti (57) ABSTRACT

An oral care implement used for treatment of a user's oral cavity. The oral care implement may include a body having a longitudinal axis, a first hard plastic component, and a second hard plastic component. The first hard plastic component may have a front surface having a perimeter portion and a central portion that is surrounded by the perimeter portion, the central portion being recessed relative to the perimeter portion. The second hard plastic component may be positioned on the central portion of the first hard plastic component and surrounded by the perimeter portion of the first hard plastic component. The second hard plastic component may have an outer surface with a plurality of grooves that are elongated in a direction of the longitudinal axis.

11 Claims, 8 Drawing Sheets

(56) References Cited

U.S. PATENT DOCUMENTS

| | | | |
|---|---|---|---|
| 6,972,106 B2 * | 12/2005 | Huber | A46B 5/02 264/273 |
| 7,083,756 B2 | 8/2006 | Strahler | |
| 7,160,508 B2 | 1/2007 | Lee | |
| 7,281,768 B2 | 10/2007 | Sato et al. | |
| 7,383,619 B2 | 6/2008 | Gross et al. | |
| 7,712,175 B2 | 5/2010 | Blanchard et al. | |
| 7,937,794 B2 | 5/2011 | Huber et al. | |
| 8,510,893 B2 | 8/2013 | Wong et al. | |
| 9,539,750 B2 | 1/2017 | Gross et al. | |
| 9,635,928 B2 | 5/2017 | Morgott | |
| 9,894,987 B2 | 2/2018 | Gross et al. | |
| 9,980,557 B2 | 5/2018 | Hohlbein | |
| 10,660,430 B2 | 5/2020 | Jimenez et al. | |
| 2008/0194765 A1 | 8/2008 | Becker et al. | |
| 2012/0272468 A1 | 11/2012 | Weisman et al. | |
| 2012/0284944 A1 | 11/2012 | Fischer et al. | |
| 2021/0186200 A1 * | 6/2021 | Hohlbein | A46B 15/0087 |
| 2021/0274927 A1 | 9/2021 | Kayser | |

FOREIGN PATENT DOCUMENTS

| | | | |
|---|---|---|---|
| CN | 1700873 | 11/2005 | |
| CN | 101657127 | 2/2010 | |
| CN | 102015877 A | 4/2011 | |
| CN | 103128904 A | 6/2013 | |
| CN | 104010547 | 8/2014 | |
| CN | 105263358 A | 1/2016 | |
| DE | 19858102 A1 * | 6/2000 | .............. A46B 5/00 |
| DE | 102006005616 | 8/2007 | |
| EP | 1951084 B1 | 6/2012 | |
| JP | 2001186926 A * | 7/2001 | .............. A46B 5/00 |
| JP | 2010001440 A | 1/2010 | |
| RU | 2411893 C1 | 2/2011 | |
| WO | 2007/053034 | 5/2007 | |
| WO | 2012149121 A1 | 11/2012 | |
| WO | WO 2016/076819 | 5/2016 | |
| WO | 2016105364 | 6/2016 | |
| WO | 2017/155039 | 9/2017 | |

OTHER PUBLICATIONS

Computer generated English Translation of DE 19858102, Friese et al., Jun. 2000. (Year: 2000).* https://www.curbellplastics.com/Research-Solutions/Plastic-Properties "Plastic Properties Table", Curbell Plastics, accessed 2019. (Year: 2019).

International Search Report and Written Opinion of the International Searching Authority in International Application PCT/US2019/026865, dated Jul. 19, 2019.

* cited by examiner

ORAL CARE IMPLEMENT

CROSS-REFERENCE TO RELATED APPLICATIONS

The present application is a continuation of U.S. patent application Ser. No. 15/953,595, filed Apr. 16, 2018, the entirety of which is incorporated herein by reference.

BACKGROUND

Oral care implements, such as toothbrushes, may be exposed during use and storage to various bacterial and/or fungus sources as well as high-levels of moisture that cultivate the growth of such bacterial and/or fungus (mold). This exposure raises hygiene concerns as to how to minimize and/or prevent bacterial and/or fungus growth on the oral care implement. Previous attempts at minimizing bacterial and/or fungal growth on an oral care implement included embedding anti-microbial agents within the body of the oral care implement. However, such practices may be ineffective if additional materials are added to the oral care implement—such as a thermoplastic elastomer ("TPE") portions—that either do not contain the anti-microbial agent or, even if it does, are especially susceptible to bacterial and/or mold growth. Additionally, eliminating such materials from a toothbrush may raise strength concerns as the additional materials impart mechanical integrity to the oral care implement. Therefore, a need exists for a hygienic oral care implement that still exhibits the requisite strength to not break during use.

BRIEF SUMMARY

The present invention is directed to an oral care implement used for treatment of a user's oral cavity. The oral care implement may include a body having a longitudinal axis, a first hard plastic component, and a second hard plastic component. The first hard plastic component may have a front surface having a perimeter portion and a central portion that is surrounded by the perimeter portion, the central portion being recessed relative to the perimeter portion. The second hard plastic component may be positioned on the central portion of the first hard plastic component and surrounded by the perimeter portion of the first hard plastic component. The second hard plastic component may have an outer surface with a plurality of grooves that are elongated in a direction of the longitudinal axis.

In one aspect, the invention may be an oral care implement comprising: a body comprising: a longitudinal axis; a first hard plastic component comprising a front surface having a perimeter portion and a central portion that is surrounded by the perimeter portion, the central portion being recessed relative to the perimeter portion; and a second hard plastic component positioned on the central portion of the first hard plastic component and being surrounded by the perimeter portion of the first hard plastic component, the second hard plastic component comprising an outer surface comprising a plurality of grooves that are elongated in a direction of the longitudinal axis.

In another aspect, the invention may be an oral care implement comprising: a head portion comprising tooth cleaning elements; a handle portion comprising: a front surface and a rear surface opposite the front surface; a first finger depression located along the front surface and a second finger depression located along the rear surface; a first plurality of grooves located along the front surface and extending along the first finger depression; and a second plurality of grooves located along the rear surface and extending along the second finger depression.

In yet another aspect, the invention may be an oral care implement comprising: a body comprising: a first component comprising a front surface having a first recess cavity, a rear surface having a second recess cavity, a support layer positioned between the first and second recess cavities, at least one aperture in the support layer that extends between the first and second recess cavities; and a second component comprising a first portion disposed within the first recess cavity, a second portion disposed within the second recess cavity, and a third portion disposed within the at least one aperture in the support layer of the first component, an outer surface of the first portion of the second component protruding from the front surface of the first component and an outer surface of the second portion of the second component protruding from the rear surface of the first component.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means+/−5% of the reference value. According to the present application, the phrase "substantially free" means less than about 0.1 wt. % based on the total of the referenced value. According to the present application, the phrase "substantially equal" means±5% of the referenced value.

Referring now to FIGS. 1-4, an oral care implement 1 comprising a body 10 that has an outer surface 11 (also referred to as an "exposed outer surface") is illustrated according to one embodiment of the present invention. The body 10 of the oral care implement 1 generally comprises a handle 100 (also referred to as a "handle portion" or "gripping portion"), a head 200 (also referred to as a "head portion"), and a neck 300 (also referred to as a "neck portion"). The handle 100 provides the user with a mechanism by which he/she can readily grip and manipulate the oral care implement 1. The handle 100 is illustrated in the Figures according to one embodiment, but may also formed from other different shapes and sizes.

The body 10 extends from a proximal end 12 to a distal end 13. The body 10 may extend along a longitudinal axis A-A from the distal end 13 to the proximal end 12. The outer surface 11 of the body 10 may comprise a front surface 14 that is opposite a rear surface 15 and a first side surface 16 opposite a second side surface 17. The first side surface 16 may extend from the front surface 14 to the rear surface 15 of the body 10. The second side surface 16 may extend from the front surface 14 to the rear surface 15 of the body 10.

The front surface 14 of the body 10 may extend from the distal end 13 to the proximal end 12 of the body 10. The rear surface 15 of the body 10 may extend from the distal end 13 to the proximal end 12 of the body 10. The first side surface 16 of the body 10 may extend from the distal end 13 to the proximal end 12 of the body 10. The second side surface 17 of the body 10 may extend from the distal end 13 to the proximal end 12 of the body 10.

It should be noted at this time that relative terms such as distal, middle, proximal, upper, lower, top, bottom, left, right etc. are merely used to delineate relative positions of the components of the body 10 with respect to one another and are not intended to be in any further way limiting of the present invention.

The body 10 may further comprise one or more surface features 40, such as, but not limited to, one or more front face grooves 41, rear face grooves 42, front face finger depression r, and/or a rear face finger depression 46. The front face grooves 41 may be present on the front surface 14 of the body 10. The front face finger depression 45 may be present on the front surface 14 of the body 10. The rear face grooves 42 may be present on the rear surface 15 of the body 10. The rear face finger depression 46 may be present on the rear surface 15 of the body 10.

The front face surface grooves 41 may be oriented substantially parallel to each other and extend at least partially between the distal 13 and proximal ends 12 of the body 10 in a direction that is substantially parallel to the longitudinal axis A-A. The front face finger depression 45 may be ovular in shape and have a first depression floor that extends to a first depth into the body 10. The rear face surface grooves 42 may extend at least partially between the distal 13 and proximal ends 12 of the body 10 in a direction that is substantially parallel to the longitudinal axis A-A. The rear face finger depression 46 may be ovular in shape and have a second depression floor that extends to a second depth into the body 10.

The head 200 may extend along the longitudinal axis A-A from a distal end 213 of the head 200 to a proximal end 212 of the head 200. The head 200 generally comprises an outer surface 201 (also referred to as an "exposed outer surface") which comprises a front surface 221, a rear surface 222 that is opposite the front surface 221 and a peripheral surface 223. The peripheral surface 223 extends between the front surface 221 and the rear surface 222, connecting the front and rear surfaces 221, 222 and defining a perimeter edge of the front surface 221.

The front surface 221, the rear surface 222, and the peripheral surface 223 of the head 200 can take on a wide variety of shapes and contours, none of which are limiting of the present invention. For example, the surfaces can be planar, contoured or combinations thereof. Furthermore, while the head 200 is normally widened relative to the neck 300, it could in some constructions simply be a continuous extension or narrowing of the handle 100. The outer surface 11 of the body 10 may comprise the outer surface 201 of the head 200.

The body 10 may further comprises a first transverse axis B-B that intersects the first side surface 16 and the second side surface 17 of the body 10. The first transverse axis B-B extends in a direction substantially orthogonal to the longitudinal axis A-A. The body 10 may further comprises a second transverse axis C-C that intersects the front surface 14 and the rear surface 15 of the body 10. The second transverse axis C-C extends in a direction substantially orthogonal to the longitudinal axis A-A. The first transverse axis B-B is substantially orthogonal to the second transverse axis C-C. The first transverse axis B-B may be orthogonal to the second transverse axis C-C.

The oral care implement 1 may comprise a plurality of cleaning elements 240 that extend from the front surface 221 of the head 200. As used herein, the term "cleaning element" is used in a generic sense to refer to any structure that can be used to clean or massage an oral surface through relative surface contact. The phrase 'tooth engaging elements" may be used in place of the phrase "cleaning element." Common examples of "cleaning elements" include, without limitation, filament bristles, fiber bristles, nylon bristles, spiral bristles, rubber bristles, elastomeric protrusions, flexible polymer protrusions, combinations thereof and/or structures containing such materials or combinations. Although not shown, the oral care implement 1 may comprise a soft tissue cleanser. The soft tissue cleanser may be present on the rear surface 222 of the head 200.

The neck 300 may extend along the longitudinal axis A-A from a distal end 313 of the neck 300 to a proximal end 312 of the neck 300. The neck 300 comprises an outer surface 301 (also referred to as an "exposed outer surface") and can take on a wide variety of shapes and contours, none of which are limiting of the present invention. The outer surface 11 of the body 10 may comprise the outer surface 301 of the neck 300. For example, the surfaces can be planar, contoured or combinations thereof. Furthermore, while the neck 300 is normally narrowed relative to the head 200 and handle 100, it could in some constructions simply be a continuous extension or narrowing of the handle 100.

The handle 100 may extend along the longitudinal axis A-A from a distal end 113 of the handle 100 to a proximal end 112 of the handle 100. The handle 100 comprises an outer surface 101 (also referred to as an "exposed outer surface") and can take on a wide variety of shapes and contours, none of which are limiting of the present invention. For example, the surfaces can be planar, contoured or combinations thereof. Furthermore, while the handle 100 is normally wider relative to the neck 300 and head 200, it could be relatively narrower than the head 200. The outer surface 11 of the body 10 may comprise the outer surface 101 of the handle 100.

The head 200 may be operably connected to the handle 100 via the neck 300. Specifically, the head 200 may extend along the longitudinal axis A-A from the distal end 213 to the head 200 to the proximal end 212 of the head 200 at which point the head 200 mates with the distal end 313 of the neck 300. The neck 300 may extend along the longitudinal axis A-A from the distal end 313 to the neck 300 to the proximal end 312 of the neck 300 at which point the neck 300 mates with the distal end 113 of the handle 100. The handle 100 may extend along the longitudinal axis A-A from the distal end 113 to the handle 100 to the proximal end 112 of the handle 100 at which point the handle 100 terminates. The distal end 213 of the head 200 may overlap with the distal end 13 of the body 10. The proximal end 112 of the handle 100 may overlap with the proximal end 12 of the body 10.

Figure 1:
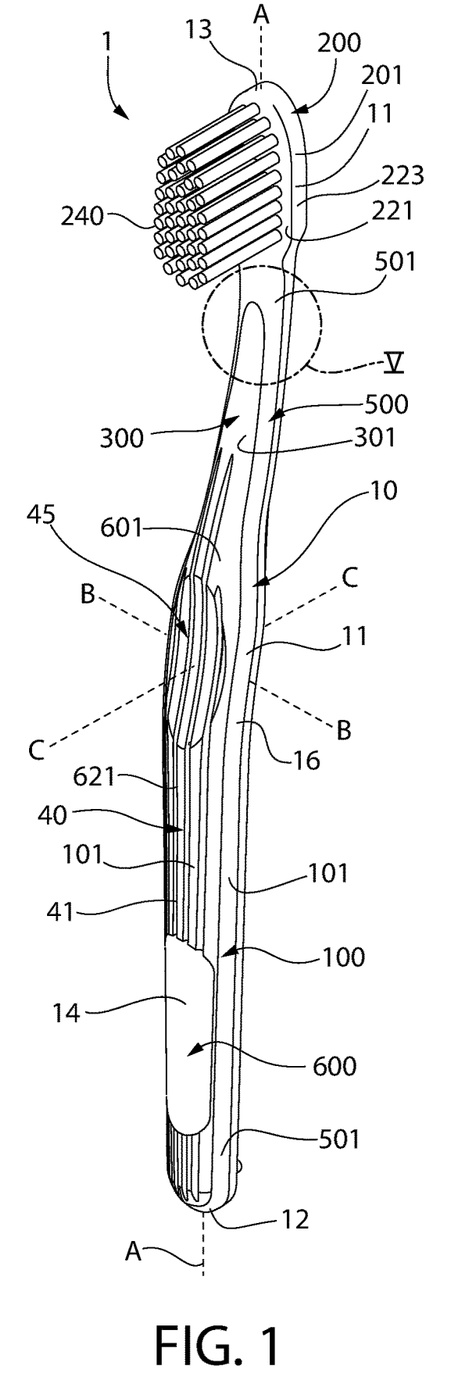
FIG. 1 is front perspective view of an oral care implement according to an embodiment of the present invention.
Figure 2:
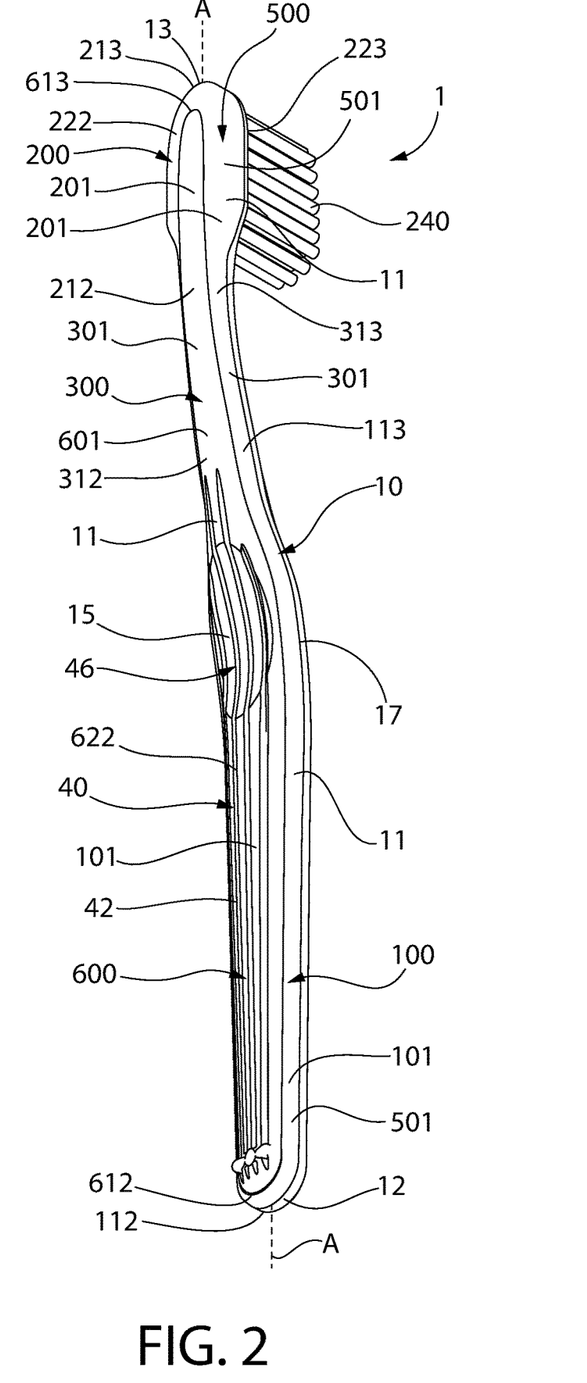
FIG. 2 is a rear perspective view of the oral care implement of FIG. 1.
Figure 3:
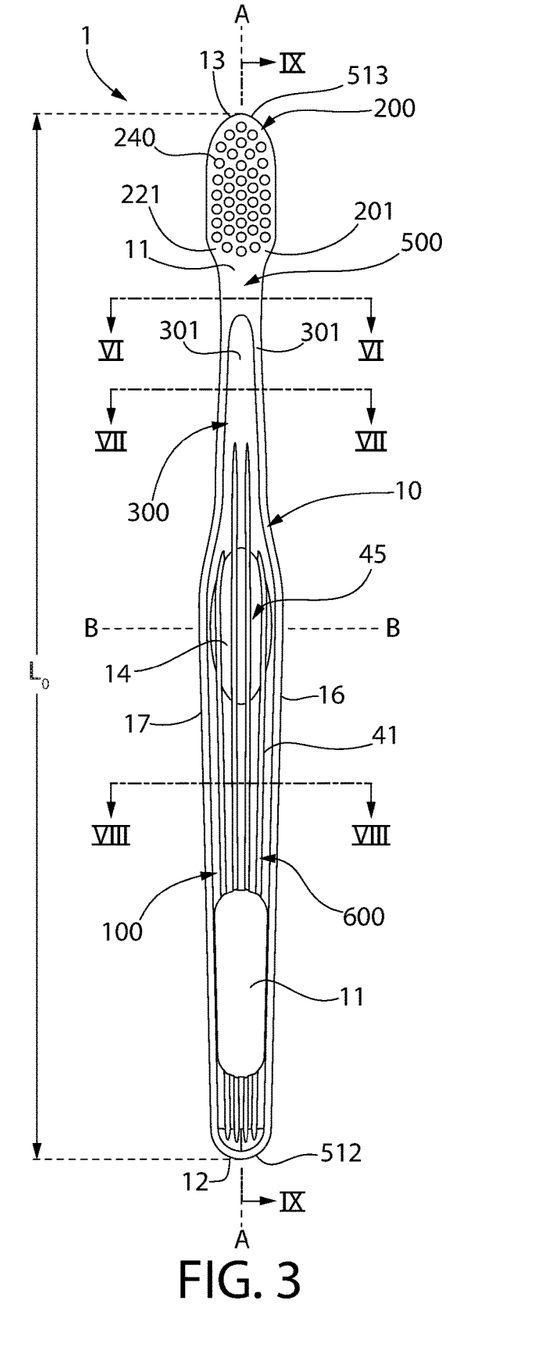
FIG. 3 is a front view of the oral care implement of FIG. 1.
Figure 4:
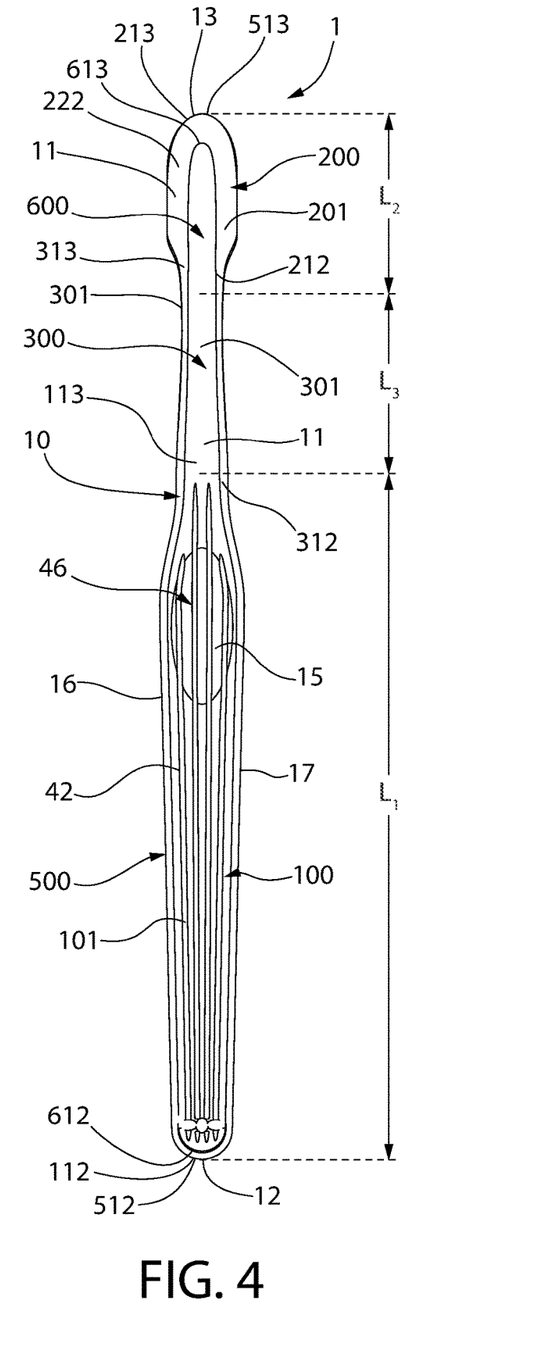
FIG. 4 is a rear view of the oral care implement of FIG. 1.
Figure 5:
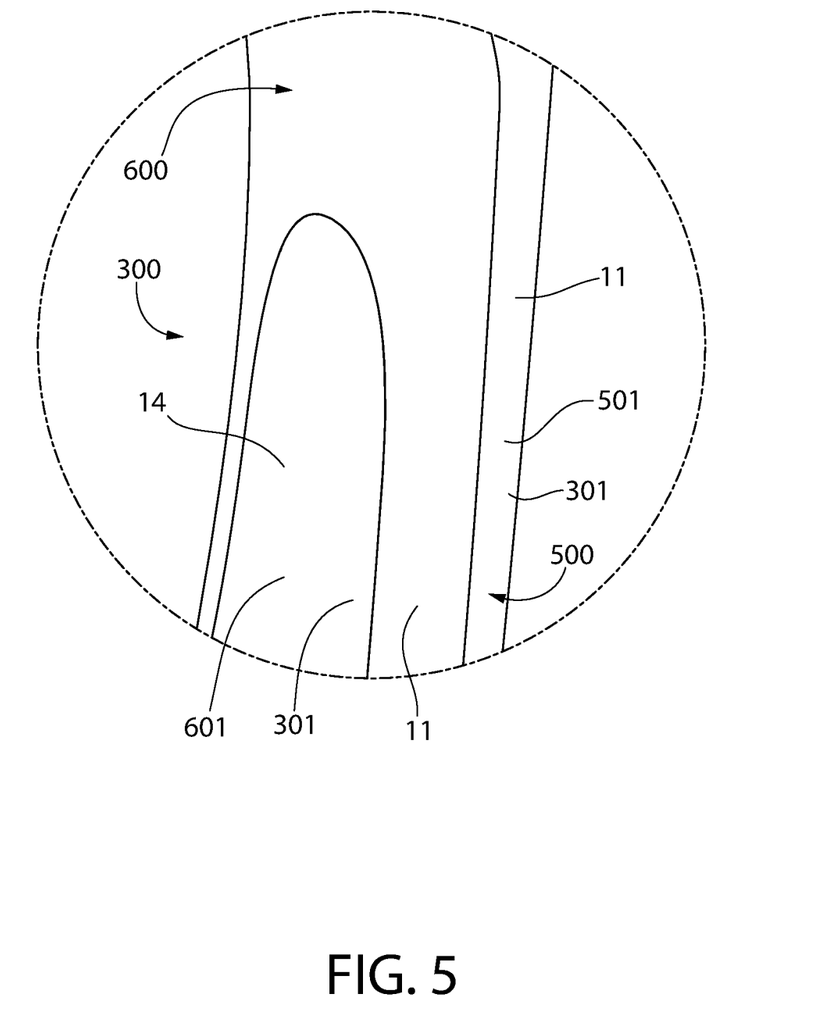
FIG. 5 is a close-up view of area V of FIG. 1.

Referring now to FIG. 4, the handle 100 may have a first length $L_1$ as measured from the distal end 113 to the proximal end 112 of the handle 100. The head 200 may have a second length $L_2$ as measured from the distal end 213 to the proximal end 212 of the head 200. The neck 300 may have a third length $L_3$ as measured from the distal end 313 to the proximal end 312 of the neck 300. The body 10 may have an overall length $L_0$ as measured from the proximal end 12 to the distal end 13 of the body 10. The sum of the first length $L_1$, the second length $L_2$, and the third length $L_3$ may equal the overall length $L_0$.

Referring now to FIGS. 1-4 and 10, the body 10 comprises a first component 500 and a second component 600. The first component 500 may extend along the longitudinal axis A-A from a proximal end 512 of the first component 500 to a distal end 513 of the first component 500. The proximal end 512 of the first component 500 may overlap with the proximal end 12 of the body 10. The distal end 513 of the first component 500 may overlap with the distal end 13 of the body 10.

Figure 10:
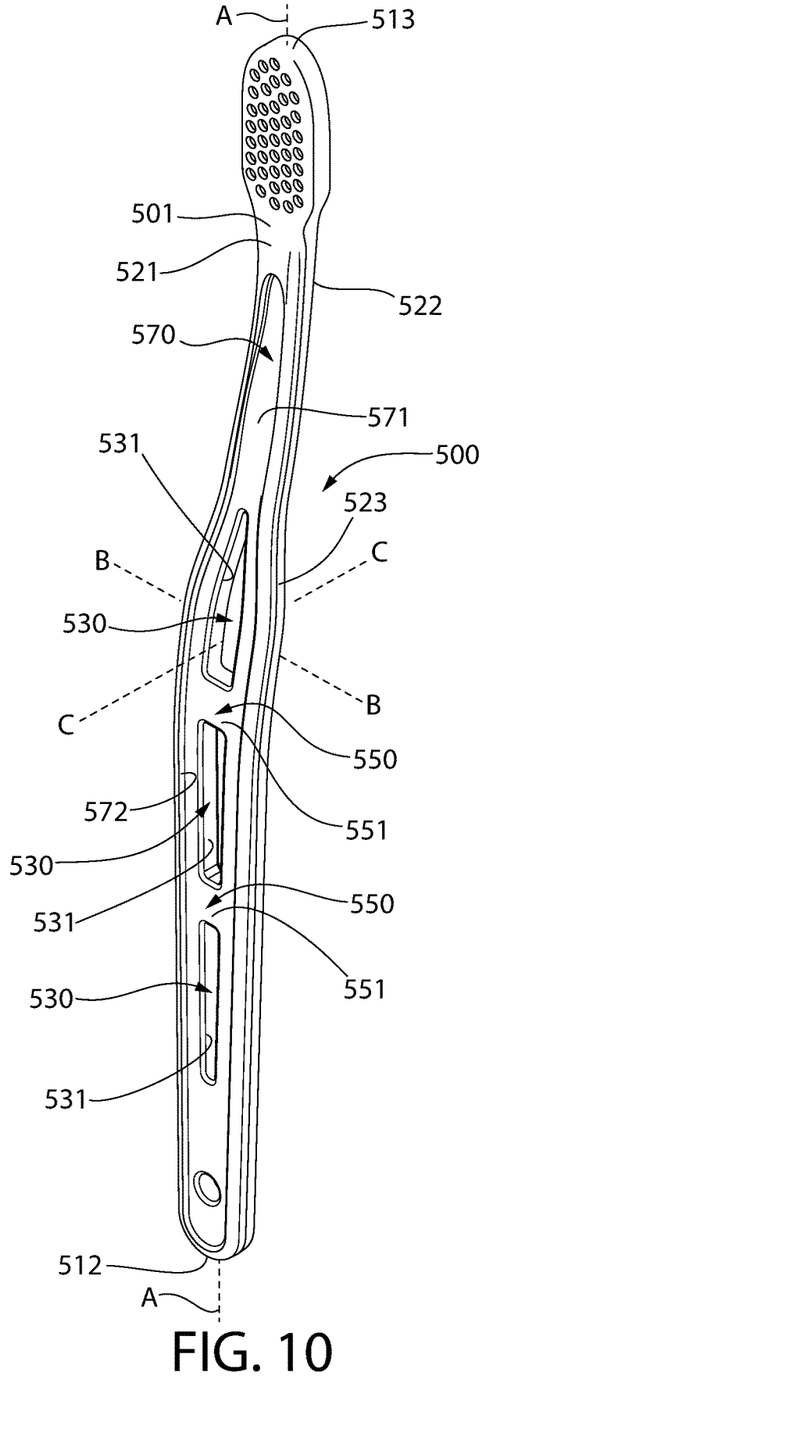
FIG. 10 is a front perspective view of a first component of a body of the oral care implement of FIG. 1.

The first component 500 may comprise at least a portion of the head 200, at least a portion of the neck 300, and at least a portion of the handle 100—as described further herein. The distal end 513 of the first component 500 may overlap with the distal end 213 of the head 200. In some embodiments, the proximal end 512 of the first component 500 may overlap with the proximal end 112 of the handle 100. The first component 500 may comprise the proximal end 212 of the head 200. The first component 500 may comprise the distal end 113 of the handle 100. The first component 500 may also comprise the distal end 313 of the neck 300. The first component 500 may also comprise the proximal end 312 of the neck 300.

The first component 500 may comprise an outer surface 501 (also referred to as an "exposed outer surface") and a core 505 that is surrounded by the outer surface 501. The first component 500 may be a continuous unitary structure formed from a single shot of a first material in an injection molding process—whereby both the core 505 and the outer surface 501 are formed from the first material. In some embodiments, the first component 500 may comprise one or more apertures 530 that extend from the outer surface 501 through the core 505 forming an open passageway from opposite outer surfaces 501 on the first component 500—as discussed further herein. The first component 500 may further comprise an anti-microbial agent (i.e., anti-fungal agent and/or anti-bacterial agent).

The first material may be a first polymeric material (also referred to as a "first plastic material"). The first plastic material is preferably a hard plastic. Therefore, the body 500 may be formed from a first hard plastic material. The phrase "hard plastic" refers to a material that is not elastomeric—e.g., "hard plastic" is not a thermoplastic elastomer ("TPE"). Rather, the phrase "hard plastic" refers to materials that exhibits a Shore D hardness value of at least 60. According to the present invention, the first hard plastic material may have a Shore D hardness value ranging from about 60 to about 90—including all hardness values and sub-ranges there-between. The first hard plastic material may have a Shore D hardness of 61, 62, 63, 64, 65, 66, 67, 68, 69, 70, 71, 72, 73, 74, 75, 76, 77, 78, 79, 80, 81, 82, 83, 84, 85, 86, 87, 88, 89, 90—including ranges having minimum and maximum values of these integers. In a preferred embodiment, the first hard plastic material may have a Shore D hardness value ranging from about 70 to about 85—including all hardness values and sub-ranges there-between.

The first hard plastic may include polyolefin homopolymer as well as polyolefin copolymers. Non-limiting examples of polyolefin include polyethylene, polypropylene, and mixtures thereof. In a preferred embodiment, the polyolefin of the present invention includes polypropylene.

The first hard plastic may have a first density ranging from about 0.8 g/cm$^3$ to about 1.0 g/cm$^3$—including all densities and sub-ranges there-between. The first hard plastic may have a specific gravity ranging from about 0.8 to about 1.0—including all densities and sub-ranges there-between.

In a preferred embodiment, the first density may be about 0.9 g/cm$^3$. In a preferred embodiment, the first specific gravity may be about 0.9.

The first hard plastic may have a first ductility as reflected by impact strength of the material. Impact strength is represented by the unit ft-lb/in and measured by performing an notched izod impact test using ASTM D256 methodology at room temperature (i.e., 23° C.). The izod impact test measures the amount of energy per unit distance before a material fractures. According to the present invention, the first hard plastic may have a first impact strength ranging from about 0.3 ft-lb/in to about 1.0 ft-lb/in—including all values and sub-ranges there-between. In some embodiments, the first hard plastic may have a first impact strength ranging from about 0.4 ft-lb/in to about 0.7 ft-lb/in—including all values and sub-ranges there-between. In some embodiments, the first hard plastic may have a first impact strength of about 0.5 ft-lb/in.

The term "homopolymers" is an art accepted term that refers to a polymer being formed from a single type of mer unit—e.g., homopolymer of polypropylene only contains mer units of propylene. The term "copolymer" is an art accepted term that refers to a polymer being formed from a at least two different mer units. Copolymer include, but are not limited to, block copolymers, terpolymers, graft copolymers, alternating copolymers, periodic copolymers, and the like.

Block copolymers refer to polymers having two different homopolymers subunits linked together by covalent bonds. Block copolymers having two or three distinct blocks are referred to as diblock copolymers and triblock copolymers, respectively. Terpolymers refer to copolymers formed from three distinct monomers—which results in a copolymer having three distinct mer units within the polymer backbone. Alternating copolymers refer to polymers have alternating repeating units formed from different mer units. Graft polymers refer to a polymer backbone formed from a first polymer and pendant polymer chains covalently bonded to and extending from the first polymer, whereby the pendant polymer chains may be formed from a second polymer.

The copolymers of the present invention include at least one block or repeating mer unit derived from an oleic source. Stated otherwise, the copolymers of the present invention are at least partially derived from an olein mer unit—whether as a block copolymer, terpolymer, alternative copolymer, etc. In a preferred embodiment, the copolymers of the present invention are at least partially derived from a propylene mer unit—e.g. copolymers of polypropylene.

The first component 500 may be formed from the first hard plastic material that is a homopolymer of polyolefin. Thus, the core 505 and the outer surface 501 of the first component 500 may comprise polyolefin homopolymer. In a preferred embodiment, the first component 500 may be formed from a first hard plastic material that is a homopolymer of polypropylene. Thus, the core 505 and the outer surface 501 of the first component 500 may comprise polypropylene homopolymers.

The first component 500 may extend along the longitudinal axis A-A a distance equal to a sum of the first length $L_1$, the second length $L_2$, and the third length $L_3$. The first component 500 may extend along the longitudinal axis A-A a distance that is substantially equal to the overall length $L_0$ of the body 10.

The first component 500 may comprise a front surface that is opposite a rear surface 522 and a side surface 523 that extends between the front surface 521 and the rear surface 522. The first transverse axis B-B may intersect the side surfaces 523 of the first component 500. The second transverse axis C-C may intersect the front surface 521 and the rear surface 522 of the first component 500.

Referring now to FIG. 10, the first component 500 may comprise a support layer 550 having one or more apertures 530 (also referred to as one or more "through-holes") that extend through core 505 to form an open passageway through from opposite outer surfaces 501 of the first component 500. The support layer 550 may comprise a first major surface 551 opposite a second major surface 552. Specifically, an aperture 530 (or a plurality of apertures 530) may extend from the front surface 521 of the first component 500, through the core 505, and to the rear surface 522 of the first component 500 in a direction that is substantially parallel to the second transverse axis C-C—thereby creating an open passageway that extends from the front surface 521 to the rear surface 522 of the first component 500. The aperture 530 may also extend from the first major surface 551 to the second major surface 552 of the support layer 550 in a direction that is substantially parallel to the second transverse axis C-C—thereby creating an open passageway that extends from the first major surface 551 to the second major surface 552 of the support layer 550. The apertures 530 may be defined by aperture walls 531 that form a closed perimeter defining the open passageway extending between the front and rear surfaces 521, 522 of the first component 500. The apertures 530 may be defined by aperture walls 531 that form a closed perimeter defining the open passageway extending between the first and second major surfaces 551, 552 of the support layer 550. The apertures 530 may occupy a first volume.

Although not pictured, in other embodiments, an aperture (or a plurality of apertures) may extend between the side surfaces 523 of the first component 500 in a direction that is substantially parallel to the first transverse axis B-B—thereby creating an open passageway that extends from opposite side surfaces 523 of the first component 500. In such embodiments, the apertures may be defined by aperture walls that form a closed perimeter defining the open passageway extending between opposite side surfaces 523 of the first component 500.

The first component 500 may further comprise a first recess cavity 570 (also referred to as a "first depression") that extends from the outer surface 501 of the first component 500 in a direction toward the rear surface 522 of the first component 500 and terminating at a first cavity floor 571 (also referred to as a "first depression floor"). The first recess cavity 570 may be defined by the first cavity floor and at least one first cavity wall 572 (also referred to as a "first depression wall"). The cavity wall 572 may intersect the first cavity floor 571. The cavity wall 572 may intersect the outer surface 501 of the first component 500. The first cavity floor 571 may be located between the outer surface 501 and the apertures 530 of the first component 500 in a direction along the second transverse axis C-C. The first cavity floor 571 may be smooth. In other embodiments, the first cavity floor 571 may be textured. The first recess cavity 570 may occupies a second volume. The second volume being the void extending from the outer surface 501 to the first cavity floor 571 and circumscribed by the cavity wall 572. The first cavity floor 571 may form the first major surface 551 of the support layer 550. Stated otherwise, the first major surface 551 of the support layer 550 may comprise the first cavity floor 571 of the first recess cavity 570.

The first recess cavity 570 may have a substantially uniform depth as measured by the distance between the outer surface 501 of the first component 500 to the first cavity floor 571 when moving along a direction that is substantially parallel to the longitudinal axis A-A. The first recess cavity 570 may have a substantially uniform depth as measured by the distance between the outer surface 501 of the first component 500 to the first cavity floor 571 when moving along a direct that is substantially parallel to the first transverse axis B-B.

In other embodiments, the first recess cavity 570 may have a non-uniform depth as measured by the distance between the outer surface 501 of the first component 500 to the first cavity floor 571 when moving along a direction that is substantially parallel to the longitudinal axis A-A. In such embodiments, the depth of the first recess cavity 570 may increase while moving along the longitudinal axis A-A in a direction extending from the distal end 513 of the first component 500 to the proximal end 512 of the first component 500. Alternatively, the depth of the first recess cavity 570 may decrease while moving along the longitudinal axis A-A in a direction from the distal end 513 of the first component 500 to the proximal end 512 of the first component 500.

In some embodiments, the depth of the first recess cavity 570 may have a first depth as measured at the adjacent-most location of the proximal end 512 of the fir component 500, a second depth as measured at the adjacent-most location of the distal end 512 of the first component 500, and a third depth located between the first and second depths along the longitudinal axis A-A. In such embodiments, the third depth may be greater than the first and/or second depth. In other embodiments, the third depth may be less than the first and/or second depth.

In other embodiments, the first recess cavity 570 may have a non-uniform depth as measured by the distance between the outer surface 501 of the body 500 to the cavity floor 571 and moving along a direction that is substantially parallel to the first transverse axis B-B. In such embodiments, the depth of the first recess cavity 570 may increase while moving along the first transverse axis B-B in a direction extending between opposite side surfaces 523 of the first component 500. Alternatively, the depth of the first recess cavity 570 may decrease while moving along the first transverse axis B-B in a direction extending between opposite side surfaces 523 of the first component 1500.

In some embodiments, the depth of the first recess cavity 570 may have a first depth as measured at the adjacent-most location to side surface 523 of the first component 500, a second depth as measured at the adjacent-most location of an opposite side surface 523, and a third depth located between the first and second depths along the longitudinal axis. In such embodiments, the third depth may be greater than the first and/or second depth. In other embodiments, the third depth may be less than the first and/or second depth.

The first component 500 may comprise a second recess cavity 580 (also referred to as a "second depression") present on the rear surface 522 of the first component 500, whereby the second recess cavity 580 extends from the outer surface 501 to a second cavity floor 581 (also referred to as a "second depression floor"). The foregoing discussion with respect to the first recess cavity 570 also applies to the second recess cavity 580. As discussed further herein, the apertures 530 may extend between the first cavity floor 571 and the second cavity floor 581. The second recess cavity 2580 may form a void that occupies a third volume.

The second and third volume may be equal. In other embodiments, the second and third volume may be different. The second volume may be greater than the third volume. The third volume may be greater than the second volume.

The maximum depth of the first recess cavity 570 may be equal to the maximum depth of the second recess cavity 580. In other embodiments, the maximum depth of the first recess cavity 570 may be greater than the maximum depth of the second recess cavity 580. In other embodiments, the maximum depth of the first recess cavity 570 may be less than the maximum depth of the second recess cavity 580.

The apertures 530 may extend from the first cavity floor 571 of the first recess cavity 570 to the second cavity floor 581 of the second recess cavity 580. Specifically, the aperture walls 531 may extend from the first cavity floor 571 of the first recess cavity 570 to the second cavity floor 581 of the second recess cavity 580. The second cavity floor 581 may form the second major surface 552 of the support layer 550. Stated otherwise, the second major surface 552 of the support layer 550 may comprise the second cavity floor 581 of the second recess cavity 580.

The second component 600 may be over-molded onto the first component 500. The second component 600 extends along the longitudinal axis A-A from a proximal end 612 of the second component 600 to a distal end 613 of the second component 600. The second component 600 may comprise at least a portion of the handle 100. The second component 600 may comprise at least a portion of the neck 300. The second component 600 may comprise at least a portion of the head 200. As discussed in greater detail herein, the second component 600 may comprise a first layer 660 and a second layer 670. In some embodiments, the first component 500 may comprise a support layer 550 that is disposed between the first and second support layers 660, 670 of the second component 600.

The proximal end 612 of the second component 600 may overlap with the proximal end 12 of the body 10 (not pictured). In the exemplified embodiments, the proximal end 612 of the second component 600 may not overlap but be immediately adjacent to the proximal end 12 of the body 10.

The second component 600 may extend a total distance (herein referred to as the over-mold distance) as measured from the proximal end 612 to the distal end 613 of the second component 600. The over-mold distance may be greater than the first length $L_1$ of the handle 100.

The second component 600 may extend continuously along the longitudinal axis A-A a distance equal to a sum of the total first length $L_1$ and at least a portion of the third length $L_3$. The over-mold distance may be equal to the sum of the first length $L_1$ of the handle 100 and the third length $L_3$ of the neck 300. The over-mold distance may be greater than the sum of the first length $L_1$ of the handle 100 and the third length $L_3$ of the neck 300. The over-mold distance may be less than the overall length $L_O$ of the body 10.

In some embodiments, the second component 600 may continuously extend across the distal end 113 of the handle and past the distal end 312 of the neck 300 towards the proximal end 313 of the neck 300. In such embodiment, the proximal end 613 of the second component 600 may terminate at a location between the distal end 312 of the neck 300 and the proximal end 313 of the neck 300.

As described in greater detail herein, in other embodiments, the second component 600 may terminate before reaching the distal end 13 of the body 10 along the longitudinal axis A-A, such that the distal end 13 of the body 10 is formed by the distal end 513 of the first component 500. In such embodiments, the second component 600 may extend an over-mold distance that covers only a portion of the second length $L_2$ of the head 200—whereby the over-mold distance extends over at least a portion of the handle 100, extends over at least a portion of the neck 300, and at least a portion of the head 200 of the body 10—as discussed further herein. In some embodiments, the first component 500 forms an exposed proximal end surface 12 of the body 10 that extends between the exposed first and second side surfaces 16, 17 of the body 10.

The second component 600 may comprise an outer surface 601 (also referred to as an "exposed outer surface") that is opposite an inner surface 602, as well as core 605 that is formed there-between. The second component 600 may be a continuous unitary structure formed from a single shot of a second material that is over-molded onto the first component 500 in an injection molding process—whereby the outer surface 601, inner surface 602, and the core 605 are formed from the second material. The second component 600 may further comprise an anti-microbial agent (i.e., anti-fungal agent and/or anti-bacterial agent).

The second material may be a second polymeric material (also referred to as a "second plastic material"). The second plastic material is preferably a hard plastic. Therefore, the second component 600 may be formed from a second hard plastic material. According to the present invention, the second hard plastic material may have a Shore D hardness value ranging from about 60 to about 90—including all hardness values and sub-ranges there-between. The hardness of the first plastic material and the second plastic material may be substantially equal. The second hard plastic material may have a Shore D hardness of 61, 62, 63, 64, 65, 66, 67, 68, 69, 70, 71, 72, 73, 74, 75, 76, 77, 78, 79, 80, 81, 82, 83, 84, 85, 86, 87, 88, 89—including ranges having minimum and maximum values of these integers.

Additionally, the second hard plastic material is more ductile than the first hard plastic material (also referred as the second hard plastic material as having a "greater ductility" than the first hard plastic material). The term "ductility" refers to a material's ability to deform without fracture.

The second hard plastic may include one of the aforementioned polyolefin homopolymer or copolymers. In a preferred embodiment, the second hard plastic material is a copolymer of polypropylene—whereby the copolymer includes first blocks and/or mer units of propylene (or polypropylene) and second blocks that are different from the first blocks, whereby the second blocks impart greater ductility to the second hard plastic material when compared to the first hard plastic material. In a preferred embodiment, the second hard plastic material is impact-modified polypropylene copolymer, whereby the second block is ethylene. The second block may be referenced to as a "co-mer"—whereby the co-mer is present in an amount ranging from about 1 wt. % to about 5 wt. % based on the total weight of the copolymer—including all amounts and sub-ranges there-between. In a preferred embodiment, the co-mer may be present in an amount ranging from about 2 wt. % to about 4 wt. % based on the total weight of the copolymer—including all amounts and sub-ranges there-between.

The second hard plastic may have a second density of about 0.8 $g/cm^3$ to about 1.0 $g/cm^3$—including all densities and sub-ranges there-between. The second hard plastic may have a first specific gravity ranging from about 0.8 to about 1.0—including all densities and sub-ranges there-between. In a preferred embodiment, the first density may be about 0.9 $g/cm^3$. In a preferred embodiment, the first gravity may be about 0.9. The first density may be substantially equal to the second density. The first specific gravity may be substantially equal to the second specific gravity.

The second hard plastic may have a second ductility as reflected by impact strength of the material. According to the present invention, the second hard plastic may have a second impact strength ranging from about 1.0 ft-lb/in to about 2.0 ft-lb/in—including all values and sub-ranges there-between. In some embodiments, the second hard plastic may have a second impact strength ranging from about 1.1 ft-lb/in to about 1.8 ft-lb/in—including all values and sub-ranges there-between. In some embodiments, the second hard plastic may have a second impact strength of about 1.6 ft-lb/in.

According to the present invention, a ratio between the first notched izod impact strength of the first hard plastic and the second notched izod impact strength (also referred to as a "ductility ratio") may range from about 1.5:1.0 to about 4.0:1.0—including all ratios and sub-ranges there-between. According to the present invention, the ductility ratio may range from about 2.0:1.0 to about 3.5:1.0—including all ratios and sub-ranges there-between. According to the present invention, the ductility ratio may range from about 2.5:1.0 to about 3.5:1.0—including all ratios and sub-ranges there-between. In some embodiments, the ductility ratio may be about 3.2:1.0.

Additionally, a ratio of the first hardness to the second hardness (also referred to as a "hardness ratio") may range from about 1.1:1 to about 1:1. The first hardness may be substantially equal to the second hardness.

The second component 600 may be formed from the second hard plastic material that is a copolymer of polyolefin. Thus, the outer surface 601, inner surface 602, and core 605 of the second component 600 may comprise the copolymer of polyolefin. In a preferred embodiment, the second component 600 may be formed from the second hard plastic material that is a copolymer of polypropylene. Thus, the outer surface 601, inner surface 602, and core 605 of the second component 600 may comprise copolymer of polypropylene.

In some embodiments, the second hard plastic material may be a blend of polyolefin homopolymer and an impact modifier polymer. In a non-limiting embodiment, the impact modifier polymer may metallocene polyolefin. In a non-limiting embodiment, the metallocene polyolefin may be polyethylene homopolymer, copolymer, or blends thereof. In a non-limiting embodiment, the impact modifier polymer may be polyethylene homopolymer, copolymer, or blends thereof. The impact modifier polymer may have a specific gravity of about 0.86 to about 0.88. The impact modifier polymer may have a Shore D hardness of about 25 to about 50—including all hardness values and sub-ranges there-between. A ratio of the first hardness to the third hardness may range from about 2:1 to about 4:1—including all hardness values and sub-ranges there-between. A ratio of the first hardness to the second hardness may range from about 2:1 to about 4:1—including all hardness values and sub-ranges there-between.

The impact modifier polymer may be present in an amount ranging from about 2 wt. % to about 10 wt. % based on the total weight of second hard plastic material—i.e., based on the total weight of the homopolymer and impact modifier polymer present in the second hard plastic material.

According to some embodiments of the present invention, the first and second hard plastics may be chemically compatible. The phrase "chemically compatible" may refer to materials that for a cohesive bond at the interface of the two materials during processing—for instance a polypropylene homopolymer may be chemically compatible with an impact-modified polypropylene polymer. In other embodiments of the present invention, the first and second hard plastics may chemically incompatible. The phrase "chemically incompatible" may refer to materials that fail to create a cohesive bond at the interface of the two materials during processing—for instance a polypropylene homopolymer may be chemically incompatible with an inorganic polymer or a rubber polymer (e.g., nitrile polymer).

In some embodiments, the second component 600 may continuously extend from the handle 100 to the neck 300 such that the distal end 613 of the second component 600 is located at a distance beyond distal end 113 of the handle 100 that is equal to at least 10% of the third length $L_3$. In other embodiments, the second component 600 may continuously extend from the handle 100 to the neck 300 such that the distal end 613 of the over-molded portion 600 is located at a distance beyond distal end 113 of the handle 100 that is equal to about 10% to about 99% of the third length $L_3$—including all percentages and sub-ranges there-be-tween. In other embodiments, the over-molded portion 600 may continuously extend from the handle 100 to the neck 300 such that the distal end 613 of the second component 600 is located at a distance beyond distal end 113 of the handle 100 that is equal to about 15%, 20%, 25%, 30%, 35%, 40%, 45%, 50%, 55%, 60%, 65%, 70%, 75%, 80%, 85%, 90%, or 95% of the third length $L_3$.

In other embodiments, the second component 600 may continuously extend from the handle 100 to the head 200 such that the distal end 613 of the second component 600 is located at a distance beyond distal end 313 of the neck 300 that is equal to at least 10% of the second length $L_2$. In other embodiments, the second component 600 may continuously extend from the handle 100 to the head 200 such that the distal end 613 of the over-molded portion 600 is located at a distance beyond distal end 313 of the neck 300 that is equal to about 10% to about 99% of the second length $L_2$—including all percentages and sub-ranges there-between. In other embodiments, the second component 600 may continuously extend from the handle 100 to the head 200 such that the distal end 613 of the second component 600 is located at a distance beyond distal end 313 of the neck 300 that is equal to about 15%, 20%, 25%, 30%, 35%, 40%, 45%, 50%, 55%, 60%, 65%, 70%, 75%, 80%, 85%, 90%, or 95% of the second length $L_2$.

The outer surface 11 of the body 10 may comprise the first component 500. The outer surface 11 of the body 10 may comprise the outer surface 501 of the first component 500. The outer surface 11 of the body 10 may comprise the second component 600. The outer surface 11 of the body 10 may comprise the outer surface 601 of the second component 600.

The exposed front surface 14 of the body 10 may comprise the first component 500. Specifically, the exposed front surface 14 of the body 10 may comprise the front exposed surface 521 of the first component 500. The exposed rear surface 15 of the body 10 may comprise the first component 500. Specifically, the exposed rear surface 15 of the body 10 may comprise the rear exposed surface 522 of the first component 500. In some embodiments, the second component 600 forms a portion of the exposed front surface 14 of the body 10 and a portion of the exposed rear surface 15 of the body 10.

The first exposed side surface 16 of the body 10 may comprise the first component 500. Specifically, the first exposed side surface 16 of the body 10 may comprise the outer surface 501 of the first component 500. The second exposed side surface 17 of the body 10 may comprise the first component 500. Specifically, the second exposed side surface 17 of the body 10 may comprise the outer surface 501 of the first component 500. In some embodiments, the first component 500 forms a portion of an exposed first side surface 16 of the body 10 and a portion of an exposed second side surface 17 of the body 10.

The exposed front surface 14 of the body 10 may comprise the second component 600. Specifically, the exposed front surface 14 of the body 10 may comprise the front exposed surface 621 of the second component 600. The exposed rear surface 15 of the body 10 may comprise the second component 600. Specifically, the exposed rear surface 15 of the body 10 may comprise the rear exposed surface 622 of the second component 600.

The outer surface 201 of the head 200 may comprise the first component 500. The outer surface 201 of the head 200 may comprise the outer surface 501 of the first component 500. The outer surface 201 of the head 200 may comprise the second component 600. The outer surface 201 of the head 200 may comprise the outer surface 601 of the second component 600.

The outer surface 101 of the handle 100 may comprise the second component 600. The outer surface 101 of the handle 100 may comprise the outer surface 601 of the second component 600. As described further herein, the outer surface 101 of the handle 100 may further comprise the first component 500. Specifically, the outer surface 101 of the handle 100 may further comprise the outer surface 501 of the first component 500. The outer surface 301 of the neck 300 may comprise a portion of the first component 500 and a portion of the second component 600. The outer surface 301 of the neck 300 may comprise the outer surface 501 of the first component 500 and the outer surface 601 of the second component 600.

In some embodiments, the neck 300 of the body 10 may comprise the portion of the exposed front surface 14 of the body 10 formed by the second component 600 and the portion of the exposed rear surface 15 of the body 10 formed by the second component 600. In some embodiments, the handle 100 of the body 10 comprises the portion of the exposed front surface 14 of the body 10 formed by the second component 600 and the portion of the exposed rear surface 15 of the body 100 formed by the second component 600.

The first component 500 of the present invention may be substantially free of TPE. The second component 600 of the present invention may be substantially free of TPE. The body 10 of the present invention may be substantially free of TPE.

Although not limited to, the body 10 of the present invention may be formed by a method that includes injection molding the first hard plastic material into a mold to form the first component 500. Subsequently, after providing the first component 500 formed from a first hard plastic material, over-molding the second hard plastic material onto the first component 500 such that the second hard plastic material spans the handle 100 and neck 300—as previously discussed.

In such methodology, the inner surface 602 of the second component 600 may directly contact the outer surface 501 of the first component 500.

According to the present invention the body 10 may have a handle 100 formed entirely from the first and second hard plastic material—whereby the second hard plastic material of the second component 600 is over-molded onto the first hard plastic material of the first component 500. According to the present invention the body 10 may have a neck 300 formed entirely from the first and second hard plastic material—whereby the second hard plastic material of the second component 600 is over-molded onto the first hard plastic material of the first component 500. According to the present invention, the body 10 may have a head 200 formed entirely from the first and second hard plastic material—whereby the second hard plastic material of the second component 600 is over-molded onto the first hard plastic material of the first component 500.

According to the present invention, by over-molding the second material of the second component 600 onto the first material of the first component 500, the resulting body 10 exhibits superior hygiene characteristics by withstanding fungal growth (mold) as compared to a body formed with over-molded TPE portions. Furthermore, as demonstrated in the examples section, the second component being formed from the second hard plastic material into the neck area avoids breakage issues by using a second hard plastic material that is more ductile than the first hard plastic material. By making the surface of the second component 600 more ductile, it is much less prone to allow cracks to develop.

The second component 600 may be over-molded onto the first component 500 such that at least a portion of the second component 600 is located within the first recess cavity 570. The second component 600 may be over-molded to the first component 500 such that at least a portion of the second component 600 is located within the second recess cavity 580. The second component 600 may be over-molded to the first component 500 such that at least a portion of the second component 600 is located within the open passage formed by the aperture 530.

The second component 600 may extend beyond the front surface 521 of the first component 500 such that the outer surface 601 of the second component 600 extends beyond the outer surface 501 of the first component 500 in a radial direction from the longitudinal axis A-A. The second component 600 may extend beyond the rear surface 522 of the body 500 such that the outer surface 601 of the second component 600 extends beyond the outer surface 501 of the first component 500 in a radial direction from the longitudinal axis A-A.

Figure 8:
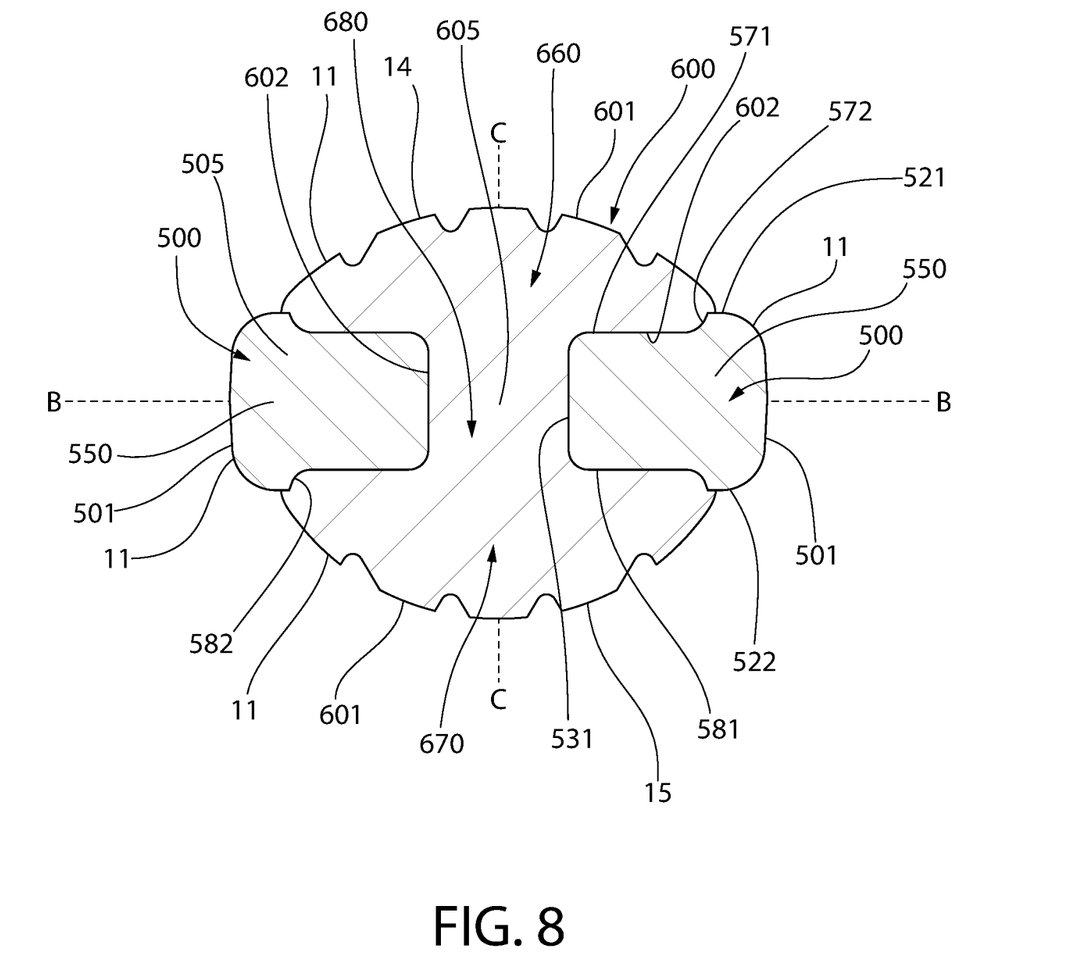
FIG. 8 is cross-sectional view taken along line VIII-VIII in FIG. 3.
Figure 9:
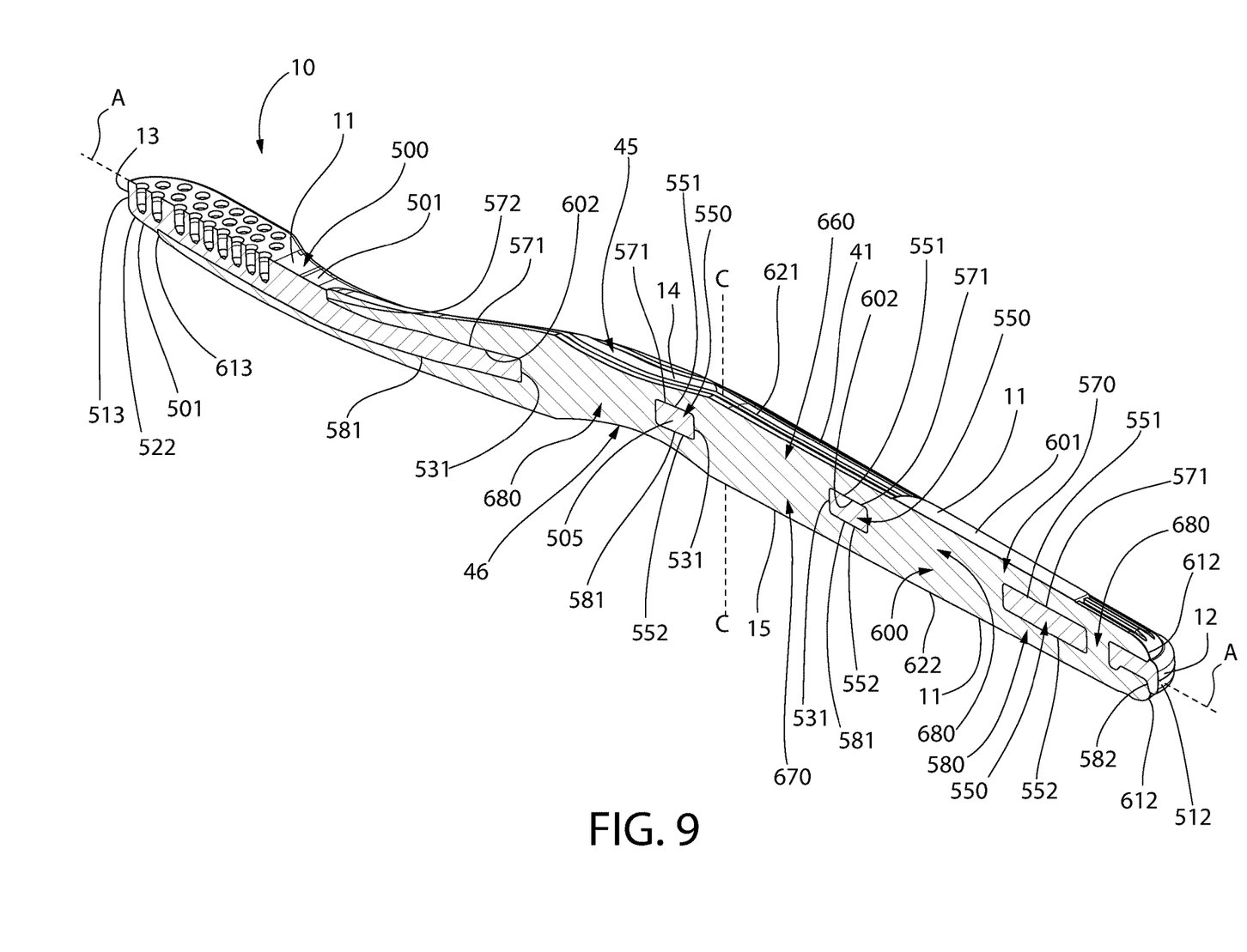
FIG. 9 is a cross-sectional view taken along line IX-IX in FIG. 3.

Referring now to FIGS. 8 and 9, the second material may be over-mold to the first component 500 such that the inner surface 602 of the second component 600 directly contacts at least one of the first cavity floor 571 of the first recess cavity 570 and/or the second cavity floor 581 of the second recess cavity 580. The second material may be over-mold to the first component 500 such that the inner surface 602 of the second component 600 directly contacts at least one of the first cavity wall 572 of the first recess cavity 570 and/or the second cavity wall 582 of the second recess cavity 580. The second material may be over-mold to the first component 500 such that the inner surface 602 of the second component 600 directly contacts aperture walls 531 of the aperture 530.

The second material may be over-mold to the first component 500 such that second component 600 is present in the first recess cavity 570, the second recess cavity 580, and at least one aperture 530 of the first component 500—whereby the second component 600 forms a single integrally formed structure. State otherwise, the core 605 of the second component 600 may extend continuously from the first recess cavity 570, through at least one aperture 530, to the second recess cavity 580—see FIG. 9. In such configurations, the second material may extend continuously from opposite outer surfaces 11 of the body 10 along a direction that is substantially parallel to the second transverse axis C-C. In such configuration, the second material may form a portion of the front surface 14 and the rear surface 15 of the body 10, whereby the second material extends continuously from the front surface 14 to the rear surface 15 in a direction that is substantially parallel to the second transverse axis C-C.

The second material may be over-molded to the first component 500 such that at least a portion of the first layer 660 of the second component 600 is located within the first recess cavity 570, at least a portion of second layer 670 of the second component 600 is located within the second recess cavity 580, and post 680 connecting the first layer 660 to the second layer 670 is located within the open passage formed by the aperture 530. In such embodiments, the post 680 may occupy a volume that is substantially equal to the third volume created by the aperture 530. The first layer 660, the second layer 670, and the post 680 may be integrally formed as a monolithic structure.

The second component 600 may extend beyond the front exposed surface 521 of the first component 500 such that the outer surface 601 of the second component 600 formed by the first layer 660 extends beyond the exposed front surface 521 of the first component 500 in a direction substantially parallel to the second transverse axis C-C. The second component 600 may extend beyond the rear exposed surface 522 of the first component 500 such that the outer surface 601 of the second component 600 extends beyond exposed rear surface 522 of the second component in a direction substantially parallel to the second transverse axis C-C.

Figure 6:
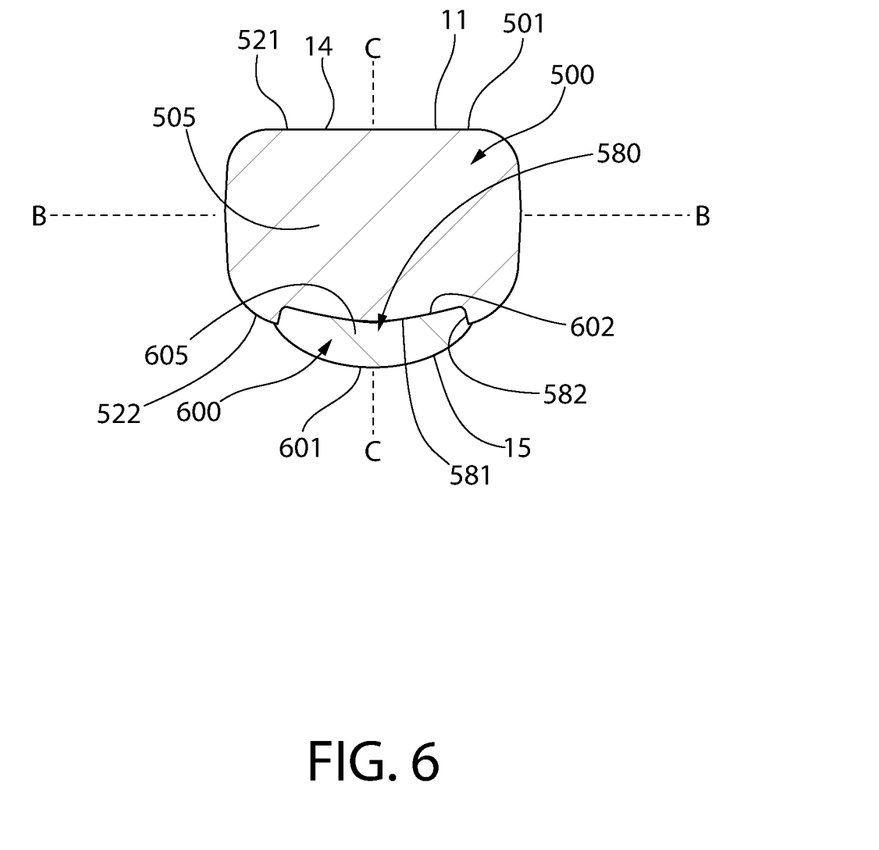
FIG. 6 is cross-sectional view taken along line VI-VI in FIG. 3.
Figure 7:
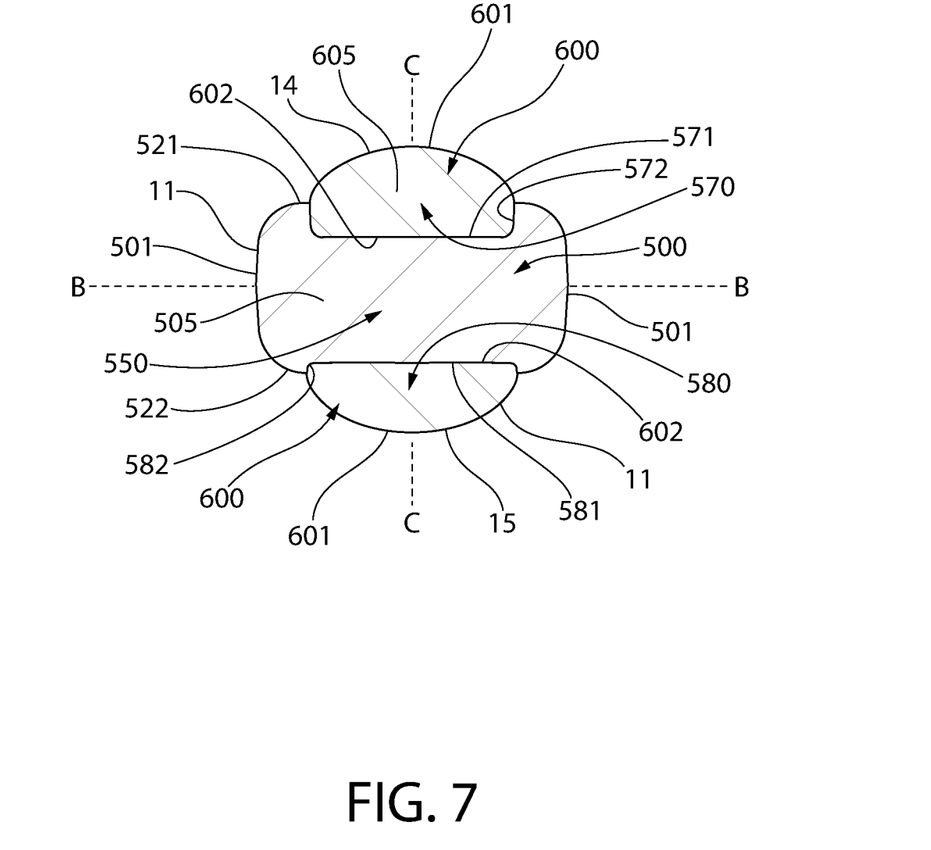
FIG. 7 is cross-sectional view taken along line VII-VII in FIG. 3.

Referring now to FIG. 6, the second material may also be over-molded to the first component 500 such that second component 600 is present in the second recess cavity 580. In such configuration, the exposed front surface 14 of the body 10 may be formed by the front exposed surface 521 of the first component 500 and the exposed rear surface 15 of the body 10 may be formed by the outer surface 601 of the second component 600.

EXAMPLES

Experiment 1

A first test was performed to measure fracture strength of a body at the neck, whereby a first component of the body was formed from the polypropylene homopolymer and a second component formed from impact modified polypropylene copolymer was over-molded onto the first component along the neck. The materials used in this experiment have the following characteristics as set forth in Table 1.

TABLE 1

| | Polypropylene Homopolymer | Impact-Modified Polypropylene Copolymer |
|---|---|---|
| Specific Gravity | 0.9 | 0.9 |
| Flexural Modulus | 210000 psi | 180000 psi |
| Tensile Strength at Yield | 4900 psi | 4100 psi |
| Tensile Elongate At Yield | 10% | 5% to 9% |
| Notched Izod Impact (ASTM D256 at 23° C.) | 0.5 ft-lb/in | 1.6 ft-lb/in |

Additionally, the hardness of the polypropylene homopolymer was substantially equal to the hardness of the impact-modified polypropylene copolymer.

Each neck was subjected to a pendulum impact drop test with the resulting impact force measured for each drop—the results are provided in Table 2.

TABLE 2

| Test (0197-071) | lbf | Fracture | Test (0197-072) | lbf | Fracture |
|---|---|---|---|---|---|
| 1 | 26.15 | No | 1 | 26.56 | No |
| 2 | 26.98 | No | 2 | 27.13 | No |
| 3 | 27.04 | No | 3 | 26.75 | No |
| 4 | 26.19 | No | 4 | 27.04 | No |
| 5 | 27.64 | No | 5 | 26.42 | No |
| 6 | 25.85 | No | 6 | 26.19 | No |
| 7 | 25.94 | No | 7 | 26.58 | No |
| 8 | 25.83 | No | 8 | 26.62 | No |
| 9 | 26.03 | No | 9 | 26.79 | No |
| 10 | 25.64 | No | 10 | 25.82 | No |

When the force exceeded 25 lbf, no break or fracture in the neck area resulted. Comparative necks were also tested formed exclusively from polypropylene homopolymers—whereby such necks exhibited break and/or fracture during testing.

Experiment 2

A second test was performed to measure fracture strength of a body at the head, whereby a first component of the body was formed from the polypropylene homopolymer and a second component formed from impact modified polypropylene copolymer was over-molded onto the first component along the neck. The polypropylene homopolymer and the impact modified polypropylene copolymer being the same as used in Experiment 1. Each head was subjected to a pendulum impact drop test with the resulting impact force measured for each drop.

TABLE 3

| Test (0197-071) | lbf | Fracture | Test (0197-072) | lbf | Fracture |
|---|---|---|---|---|---|
| 1 | 20.82 | No | 1 | 22.35 | No |
| 2 | 21.61 | No | 2 | 22.53 | No |
| 3 | 21.52 | No | 3 | 21.76 | No |
| 4 | 21.02 | No | 4 | 22.05 | No |
| 5 | 21.58 | No | 5 | 22.48 | No |
| 6 | 20.59 | No | 6 | 22.71 | No |
| 7 | 20.56 | No | 7 | 22.48 | No |
| 8 | 20.82 | No | 8 | 22.44 | No |
| 9 | 21.04 | No | 9 | 22.71 | No |
| 10 | 20.64 | No | 10 | 22.26 | No |

When the force exceeded 20 lbf, no break or fracture in the neck area resulted. Comparative necks were also tested formed exclusively from polypropylene homopolymers—whereby such necks exhibited break and/or fracture during testing.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An oral care implement comprising:
   a body comprising:
      a longitudinal axis;
      a first hard plastic component comprising a front surface having a perimeter portion and a central portion that is surrounded by the perimeter portion, the central portion being recessed relative to the perimeter portion; and
      a second hard plastic component positioned on the central portion of the first hard plastic component and being surrounded by the perimeter portion of the first hard plastic component, the second hard plastic component comprising an outer surface comprising a plurality of grooves that are elongated in a direction of the longitudinal axis;
   wherein the first hard plastic component comprises the front surface and a rear surface opposite the front surface, the central portion comprising a first recess cavity in the front surface and a second recess cavity in the rear surface, and wherein the second hard plastic component is disposed within each of the first and second recess cavities, an outer surface of the second hard plastic component protruding from the front and rear surfaces of the first hard plastic component; and
   wherein the first recess cavity comprises a first floor and the second recess cavity comprises a second floor, and further comprising at least one aperture extending from the first floor to the second floor, the second hard plastic component disposed within and extending through the at least one aperture so that a portion of the second hard plastic component located in the first recess cavity is integral with a portion of the second hard plastic component located in the second recess cavity.

2. The oral care implement according to claim 1 wherein the body is free of thermoplastic elastomer.

3. The oral care implement according to claim 1 wherein the body comprises a proximal end and a distal end, and wherein a distance measured between adjacent ones of the plurality of grooves increases moving from the proximal end of the body towards the distal end of the body.

4. The oral care implement according to claim 1 wherein the first hard plastic component comprises the front surface, a rear surface, a first side surface, and a second side surface, and wherein the first and second side surfaces of the first hard plastic component and the front and rear surfaces of the first hard plastic component located along the perimeter portion of the first hard plastic component are exposed.

5. The oral care implement according to claim 1 wherein the body further comprises a head portion having a front surface and a rear surface opposite the front surface, wherein the front surface of the head portion is formed entirely by the first hard plastic component and wherein the rear surface of the head portion is formed collectively by the first and second hard plastic components, and further comprising a plurality of cleaning elements coupled to the head portion and extending from the front surface of the head portion.

6. The oral care implement according to claim 1 wherein the second hard plastic component comprises a concave finger depression, and wherein the plurality of grooves extend along the concave finger depression.

7. An oral care implement comprising:
   a body comprising:
      a first component comprising a front surface having a first recess cavity, a rear surface having a second recess cavity, a support layer positioned between the first and second recess cavities, at least one aperture in the support layer that extends between the first and second recess cavities; and
      a second component comprising a first portion disposed within the first recess cavity, a second portion disposed within the second recess cavity, and a third portion disposed within the at least one aperture in the support layer of the first component, an outer surface of the first portion of the second component protruding from the front surface of the first component and an outer surface of the second portion of the second component protruding from the rear surface of the first component;

wherein the body comprises a head portion and a handle portion, wherein the first component forms a part of the head portion and a part of the handle portion, wherein the first portion of the second component extends along the handle portion and not the head portion, and wherein the second portion of the second component extends along the handle portion and the head portion.

8. The oral care implement according to claim 7 wherein the first and second components are both formed from a hard plastic material.

9. The oral care implement according to claim 7 wherein the second component comprises a first finger depression in the outer surface of the first portion of the second component and a second finger depression in the outer surface of the second portion of the second component.

10. The oral care implement according to claim 9 further comprising a first plurality of elongated grooves formed into the outer surface of the first portion of the second component and extending along the first finger depression and a second plurality of elongated grooves formed into the outer surface of the second portion of the second component and extending along the second finger depression.

11. The oral care implement according to claim 10 wherein the body comprises a proximal end and a distal end, and wherein at least one of the first plurality of elongated grooves and at least one of the second plurality of elongated grooves extends along: (1) a first axial portion of the body located between the first and second finger depressions and the proximal end of the body; (2) a second axial portion of the body located along the first and second finger depressions; and (3) a third axial portion of the body located between the first and second finger depressions and the distal end of the body.

* * * * *